(12) United States Patent
Bragg et al.

(10) Patent No.: US 9,094,337 B2
(45) Date of Patent: Jul. 28, 2015

(54) SOURCE IDENTIFICATION PRESERVATION IN MULTIPROTOCOL LABEL SWITCHING NETWORKS

(71) Applicants: Nigel Lawrence Bragg, Cambridge (GB); Ian Hamish Duncan, Ottawa (CA)

(72) Inventors: Nigel Lawrence Bragg, Cambridge (GB); Ian Hamish Duncan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 139 days.

(21) Appl. No.: 13/900,573

(22) Filed: May 23, 2013

(65) Prior Publication Data

US 2014/0177638 A1  Jun. 26, 2014

Related U.S. Application Data

(63) Continuation-in-part of application No. 13/724,400, filed on Dec. 21, 2012.

(51) Int. Cl.
*H04L 12/26* (2006.01)
*H04L 12/723* (2013.01)

(52) U.S. Cl.
CPC .................................. *H04L 45/50* (2013.01)

(58) Field of Classification Search
None
See application file for complete search history.

(56) References Cited

U.S. PATENT DOCUMENTS

| 7,136,357 | B2 * | 11/2006 | Soumiya et al. ............. 370/236 |
| 7,161,946 | B1 * | 1/2007 | Jha ............................. 370/401 |
| 7,197,008 | B1 * | 3/2007 | Shabtay et al. .............. 370/218 |
| 7,370,119 | B2 | 5/2008 | Provine et al. |
| 7,463,584 | B2 | 12/2008 | Allan et al. |
| 7,463,639 | B1 * | 12/2008 | Rekhter ........................ 370/409 |
| 7,616,637 | B1 * | 11/2009 | Lee et al. .................... 370/394 |
| 8,194,554 | B2 | 6/2012 | Bragg et al. |
| 8,223,660 | B2 | 7/2012 | Allan et al. |
| 8,223,668 | B2 | 7/2012 | Allan et al. |
| 8,274,989 | B1 | 9/2012 | Allan et al. |
| 8,693,323 | B1 * | 4/2014 | McDysan ..................... 370/230 |
| 8,804,736 | B1 * | 8/2014 | Drake et al. .................. 370/392 |

(Continued)

FOREIGN PATENT DOCUMENTS

WO  2010056582 A2  5/2010

OTHER PUBLICATIONS

Extended European Search Report, European Patent Application No. 13195810.0, dated Feb. 17, 2014.

(Continued)

*Primary Examiner* — Anh-Vu Ly
(74) *Attorney, Agent, or Firm* — Clements Bernard PLLC; Christopher L. Bernard; Lawrence A. Baratta, Jr.

(57) ABSTRACT

A Multiprotocol Label Switching (MPLS) method, a MPLS network element, and a MPLS network include receiving a packet destined for a destination node at a source node in an MPLS network; pushing an identifier in an MPLS label on an MPLS label stack associated with the packet, wherein the identifier denotes the source node as the source of the packet and is pushed prior to any other MPLS labels on the MPLS stack; pushing one or more labels on the MPLS stack indicative of a route of the packet to the destination node; and transmitting the packet from the source node into the MPLS network. The identifier is located at the bottom of the MPLS stack thereby being a last item popped in the MPLS stack at the destination node, and the identifier can be used for updating OAM data efficiently without requiring deep packet inspection.

16 Claims, 8 Drawing Sheets

(56) References Cited

U.S. PATENT DOCUMENTS

| | | | |
|---|---|---|---|
| 2004/0196827 A1* | 10/2004 | Xu et al. | 370/352 |
| 2004/0213228 A1 | 10/2004 | Regan et al. | |
| 2005/0053071 A1* | 3/2005 | Betts et al. | 370/395.21 |
| 2005/0125490 A1* | 6/2005 | Ramia | 709/202 |
| 2005/0220096 A1 | 10/2005 | Friskney et al. | |
| 2007/0076719 A1 | 4/2007 | Allan et al. | |
| 2008/0310417 A1 | 12/2008 | Friskney et al. | |
| 2009/0059799 A1 | 3/2009 | Friskney et al. | |
| 2009/0135815 A1* | 5/2009 | Pacella | 370/389 |
| 2009/0141703 A1 | 6/2009 | Ghodrat et al. | |
| 2009/0161669 A1 | 6/2009 | Bragg et al. | |
| 2009/0168666 A1 | 7/2009 | Unbehagen et al. | |
| 2009/0168780 A1 | 7/2009 | Unbehagen et al. | |
| 2010/0040061 A1* | 2/2010 | McGuire et al. | 370/392 |
| 2010/0124231 A1 | 5/2010 | Kompella | |
| 2011/0292836 A1 | 12/2011 | Bragg et al. | |
| 2012/0069745 A1* | 3/2012 | Kini et al. | 370/252 |
| 2012/0163165 A1* | 6/2012 | Ra et al. | 370/225 |
| 2012/0163190 A1* | 6/2012 | Jocha et al. | 370/241.1 |
| 2012/0224579 A1 | 9/2012 | Ashwood-Smith | |
| 2013/0287027 A1* | 10/2013 | Ra et al. | 370/392 |
| 2014/0198634 A1* | 7/2014 | Kumar et al. | 370/228 |

OTHER PUBLICATIONS

E. Rosen, A. Viswanathan, R. Callon; Memo: "Multiprotocol Label Switching Architecture"; Network Working Group; Copyright (C) The Internet Society (Jan. 2001). http://www.ietf.org/rfc/rfc3031.txt.

Y. Rekhter, E. Rosen; Memo: "Carrying Label Information in BGP-4"; Network Working Group; Copyright (C) The Internet Society (May 2001). http://tools.ietf.org/rfc/rfc3107.txt.

E. Rosen, D. Tappan, G. Fedorkow, Y. Rekhter, D. Farinacci, T. Li, A. Conta; Memo: "MPLS Label Stack Encoding"; Network Working Group; Copyright (C) The Internet Society (Jan. 2001). http://tools.ietf.org/html/rfc3032.txt.

S. Previdi, et al., Segment Routing with IS-IS Routing Protocol, draft-previdi-filsfils-isis-segment-routing-02 Mar. 2013 http://www.ietf.org/id/draft-previdi-filsfils-isis-segment-routing-02.txt.

* cited by examiner

SOURCE IDENTIFICATION PRESERVATION IN MULTIPROTOCOL LABEL SWITCHING NETWORKS

CROSS-REFERENCE TO RELATED APPLICATION(S)

The present non-provisional patent application/patent is a continuation-in-part of U.S. patent application Ser. No. 13/724,400, filed on Dec. 21, 2012, and entitled "REDUCED COMPLEXITY MULTIPROTOCOL LABEL SWITCHING," the contents of which are incorporated in full by reference herein.

FIELD OF THE DISCLOSURE

The present disclosure relates generally to networking systems and methods. More particularly, the present disclosure relates to source identification preservation systems and methods in Multiprotocol Label Switching (MPLS) networks.

BACKGROUND OF THE DISCLOSURE

Multiprotocol Label Switching (MPLS) is a mechanism applied in networks that directs data from one network node or network element to the next based on locally significant short path labels rather than long, globally significant, network addresses, so avoiding complex lookups in a routing table. For example, MPLS is described, in part, in Request for Comments (RFC) 3032 "MPLS Label Stack Encoding," January 2001, the contents of which are incorporated by reference herein. The availability and use of RFC 3032 compatible MPLS-capable hardware for packet switching is ubiquitous, and the industry recognizes it as a cost-effective technique for packet forwarding. Even within software or network processor unit (NPU) forwarding systems, RFC 3032 packet processing provides similar simplicity and consequent high performance. However current operations of RFC 3032 packet forwarding requires very significant control protocol complexity, which stems fundamentally from the need to create and maintain link-local labels (to support label push, swap, and pop) for every end-to-end path across the network, using an array of signaling protocols such as Label Distribution Protocol (LDP), Resource Reservation Protocol-Traffic Engineering (RSVP-TE), and multicast-LDP coupled with and dependent upon routing protocols such as Intermediate System To Intermediate System (IS-IS) and Open Shortest Path First (OSPF), with or without Traffic Engineering (TE) extensions, and Border Gateway Protocol (BGP). As above, MPLS requires numerous protocols which leads to various interactions therebetween that create complexity.

In addition to the inherent complexity of such protocols, in many cases the label path signaling can only execute once the underlying unicast topology has converged, thus delaying recovery from faults. Extra control complexity in the form of Fast Reroute (FRR) and/or Loop Free Alternate (LFA) paths is therefore frequently applied, in order to mask faults until reconvergence has taken place. As above, MPLS exists, is very widely deployed, and can be configured to deliver a wide range of functionalities and services, but because of its design it requires a significant number of complex protocols.

Techniques are evolving to address the complexity and other limitations of MPLS. For example, one such technique is described in the parent application of this disclosure, U.S. patent application Ser. No. 13/724,400, filed on Dec. 21, 2012, and entitled "REDUCED COMPLEXITY MULTI- PROTOCOL LABEL SWITCHING." The reduced complexity MPLS includes techniques whereby the use of one or more MPLS labels assigned uniquely to a node within an MPLS network domain permitted substantial simplification of the operating procedures for that domain. Additionally, in draft-previdi-filsfils-isis-segment-routing-02 from the Internet Engineering Task Force (IETF), "Segment Routing with IS-IS Routing Protocol," Mar. 20, 2013, (available online at datatracker.ietf.org/doc/draft-previdi-filsfils-isis-segment-routing/), the contents of which are incorporated in full by reference herein, there is further disclosed a technique for Segment Forwarding of MPLS frames, whereby a stack of MPLS labels is interpreted, in the forwarding path of an MPLS network, as a sequence of source-routed path directives, each element of the sequence being an assigned domain-wide label advertised over the domain by a Link State routing protocol such as IS-IS. This technology is also known as MPLSDN (MPLS for Software Defined Networks (SDN)).

It is expected that Reduced Complexity MPLS and/or Segment Routing will proliferate based on the existing MPLS footprint and the inherent reduction in complexity brought by these techniques. Reduced Complexity MPLS and Segment Routing are both destination-based forwarding techniques. It is well known that destination-based forwarding techniques are "Operations, Administration, and Maintenance (OAM) lossy"; i.e., paths towards a particular destination will naturally merge, such that the identity of the source is lost. In many networks, it is highly desirable that the identity of the source is preserved, so that the performance of individual point-to-point connections may be monitored and the like, and this identity is advantageously carried in the data plane packet header itself, and not in some higher layer as an element within the packet payload.

BRIEF SUMMARY OF THE DISCLOSURE

In an exemplary embodiment, a Multiprotocol Label Switching (MPLS) method includes receiving a packet destined for a destination node at a source node in an MPLS network; pushing an identifier in an MPLS label on an MPLS label stack associated with the packet, wherein the identifier denotes the source node as the source of the packet and is pushed prior to any other MPLS labels on the MPLS stack; pushing one or more labels on the MPLS stack indicative of a route of the packet to the destination node; and transmitting the packet from the source node into the MPLS network. The MPLS method can further include popping the identifier off the packet MPLS label stack at the destination node; and updating Operations, Administration, and Maintenance (OAM) data based on the identifier. The updating OAM data can include any of: updating byte and packet counters based on the identifier; updating a traffic matrix for the MPLS network; and providing the OAM data to a network management system. The identifier can include one of a source label or an explicit reserved label placed immediately above a source label on the stack.

Optionally, the MPLS network can include a Segment Routed MPLS network whereby a stack of MPLS labels is interpreted, in a forwarding path of the MPLS network, as a sequence of source-routed path directives, each element of the sequence being an assigned domain-wide label advertised over the domain by a Link State routing protocol. Alternatively, the MPLS network can include a Reduced Complexity MPLS network whereby one or more MPLS labels are assigned uniquely to a node within the MPLS network domain thereby simplifying operating procedures for the MPLS network domain. Additionally, the packet can include a control packet in the MPLS network. The MPLS method can further include popping or swapping the one or more labels on the MPLS stack at one or more transit nodes in the MPLS network. The identifier can be located at the bottom of the MPLS stack thereby being a last item popped in the MPLS stack at the destination node.

In another exemplary embodiment, a Multiprotocol Label Switching (MPLS) network element includes at least one port; forwarding circuitry communicatively coupled to the port; and control circuitry communicatively coupled to the forwarding circuitry and the port; wherein the forwarding circuitry and the control circuitry are configured to: receive a packet destined for a destination node in an MPLS network; push an identifier contained in an MPLS label on an MPLS stack associated with the packet, wherein the identifier denotes the MPLS network element as the source of the packet and is pushed prior to any other MPLS labels on the MPLS stack; push one or more labels on the MPLS stack indicative of a route of the packet to the destination node; and transmit the packet into the MPLS network. The forwarding circuitry and the control circuitry can be further configured to: receive a second packet from the MPLS network; pop a second identifier off an MPLS stack of the second packet; and update Operations, Administration, and Maintenance (OAM) data based on the second identifier. The updating OAM data can include any of the forwarding circuitry and the control circuitry being configured to: update byte and packet counters based on the second identifier; update a traffic matrix for the MPLS network; and provide the OAM data to a network management system.

The identifier can include one of a source label or an explicit reserved label placed immediately above a source label on the stack. Optionally, the MPLS network can include a Segment Routed MPLS network whereby a stack of MPLS labels is interpreted, in a forwarding path of the MPLS network, as a sequence of source-routed path directives, each element of the sequence being an assigned domain-wide label advertised over the domain by a Link State routing protocol. Alternatively, the MPLS network can include a Reduced Complexity MPLS network whereby one or more MPLS labels are assigned uniquely to a node within the MPLS network domain thereby simplifying operating procedures for the MPLS network domain. Additionally, the packet can include a control packet in the MPLS network. The identifier can be contained in an MPLS label located at the bottom of the MPLS stack thereby being a last item popped in the MPLS stack at the destination node.

In yet another exemplary embodiment, a Multiprotocol Label Switching (MPLS) network includes a plurality of network elements connected therebetween including at least a first network element, a second network element, and a third network element; wherein a first packet is sent to the first network element from the second network element with a first source identifier contained in an MPLS label on an MPLS stack; wherein a second packet is sent to the first network element from the third network element with a second source identifier contained in an MPLS label on an MPLS stack; wherein the first network element is configured to: update Operations, Administration, and Maintenance (OAM) data associated with traffic from the second network element on receipt of the first packet and popping the first source identifier; and update the OAM data associated with traffic from the third network element on receipt of the second packet and popping the second source identifier. Optionally, the MPLS network can include a Segment Routed MPLS network whereby a stack of MPLS labels is interpreted, in a forwarding path of the MPLS network, as a sequence of source-routed path directives, each element of the sequence being an assigned domain-wide label advertised over the domain by a Link State routing protocol. Alternatively the MPLS network can include a Reduced Complexity MPLS network whereby one or more MPLS labels are assigned uniquely to a node within the MPLS network domain thereby simplifying operating procedures for the MPLS network domain.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
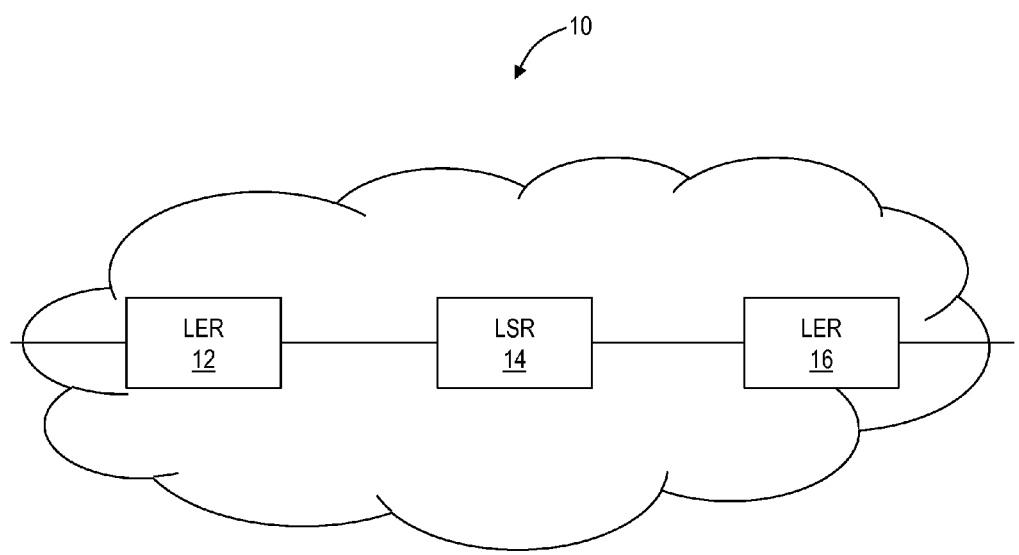
FIG. 1 is a network diagram of an exemplary MPLS network with three network elements contained therein.

In various exemplary embodiments, source identification preservation systems and methods for MPLS are described such as in Segment Routed and Reduced Complexity MPLS systems and methods. Source identification preservation systems and methods can be achieved in either a Reduced complexity MPLS network or a Segment Routed MPLS network by an operation whereby the ingress node to the Reduced complexity or MPLSDN domain pushes a label which uniquely represents itself in such a network onto the bottom-of-stack, prior to pushing the label (stack) which defines the route to the destination. That way, when the packet arrives at the destination, the last label remaining on the stack defines the packet's source, which is exactly the information required to count and otherwise characterize packet flows on a point-to-point basis. In another implementation of the technique, the "last label" above is defined not by its position in the label stack, but by the presence of an explicit reserved label identifier immediately above it in the stack. This technique is not limited to user data packets in the MPLS network. It may also be used to identify that control packets, e.g. Associated Control Channel packets, have reached their destination. Using the source identification preservation systems and methods, Operations, Administration, and Maintenance (OAM) is streamlined enabling packet and byte counts without requiring deep packet inspection at destination nodes.

In reduced complexity MPLS, changes are presented to the present MPLS operating regime whereby disjoint sets of one or more MPLS labels are uniquely and specifically associated with just one switch, i.e. each switch node is assigned one or more non-overlapping labels from the RFC 3032 20 bit label space to bind to particular service end-points at that node; which then enables these labels to embody the core properties of a destination address (DA) in the network sub-domain in which they are used. The central property is that these DA labels are constant for a given forwarding path across the entire sub-domain, remaining unchanged at any point in the network. This is possible because although historically a large label space has been needed to represent individual Internet Protocol (IP) prefixes in a flat addressing scheme, the increasing use of virtualization and the concomitant network hierarchy means that labels need only be assigned to nodes at the boundary of a hierarchical domain, and need only be unique within that domain. Once that is achieved, any and all hop-by-hop signaling protocols are unnecessary, since there is no need for label swapping, and the unchanged label-to-node binding information can be flooded by Link State routing protocols only. Thus, a low complexity Interior Gateway Protocol (IGP) (i.e., no TE extensions) is the only remaining protocol absolutely required to operate the network sub-domain. Additionally, to provide operation of cross-domain and inter-domain forwarding requires functions such as additional protocols (e.g. Targeted LDP, BGP or OpenFlow) or other mechanisms to mediate flows at sub-domain borders.

Advantageously, the reduced complexity MPLS systems and methods allow turning off all MPLS hop-by-hop signaling protocols, resulting in operational complexity reduction without loss of MPLS functional capability. The large amount of stored state necessary to support liberal label retention for restoration is removed, and replaced by in-place computation. Additionally, much faster restoration of multicast trees is achieved, because hop-by-hop signaling over the converged unicast topology is eliminated, again replaced by in-place computation. The fault set to be probed by OAM is reduced, because there is no longer a level of indirection between a Forward Equivalency Class (FEC) and its link-local representation. It is expected the reduced complexity MPLS systems and methods will provide widespread adoption as these systems and methods leverage existing, widely deployed MPLS forwarding mechanisms. The novelty lies in the elimination of label swapping from MPLS, hitherto thought to be intrinsic to MPLS operation, and the assignment of labels each uniquely associated with a single node or network element throughout the network domain, and then the distribution of these labels by flooding using the IGP. The technique described herein is referred to as "reduced complexity MPLS" but it can also be referred to as simplified MPLS, MPLS with invariant (domain-scope) labels, and the like.

Referring to FIG. 1, in an exemplary embodiment, a network diagram illustrates an MPLS network 10 with three network elements 12, 14, 16 contained therein. The network elements 12, 16 are Label Edge Routers (LER) which can also be referred to as Provider Edge (PE) nodes. The network element 14 is a Label Switch Router (LSR) which can also be referred to as Provider (P) nodes. The MPLS network 10 is presented herein for illustration purposes and those of ordinary skill in the art will recognize other deployments can include additional network elements. Within the MPLS network 10, the LSR 14 is configured to forward traffic along Label Switched Paths (LSPs) between the LERs 12, 16. MPLS is used in the MPLS network 10 to reduce a number of lookups performed at the various network elements 12, 14, 16. For example, a packet can be received by the LER 12 which conventionally performs a lookup to determine which label should be pushed onto the packet to switch the packet onto an LSP to the next hop through the MPLS network 10 to reach its destination. When the packet arrives at the LSR 14, the LSR 14 will read the MPLS label and replace the MPLS label with a new MPLS label. MPLS thus allows a single route lookup to be performed at the edge of the MPLS network 10, and allows label switching to be used instead of lookups to forward the packet across the MPLS network 10. Forwarding in an MPLS network 10 is performed by swapping a label after stripping the Media Access Control (MAC) header at each hop.

Figure 2:
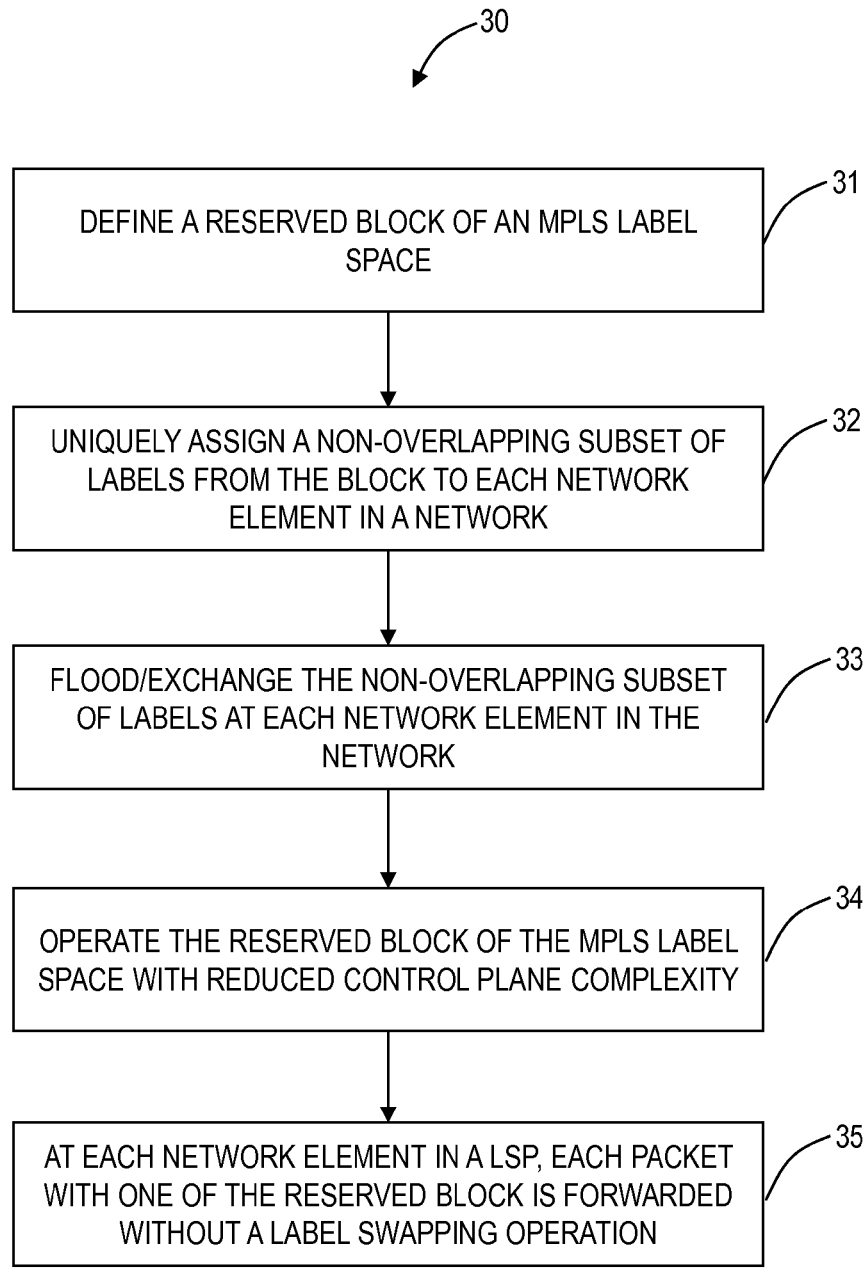
FIG. 2 is a flowchart of a reduced complexity MPLS switching method 30 for use in the MPLS network of FIG. 1.

Referring to FIG. 2, in an exemplary embodiment, a flowchart illustrates a reduced complexity MPLS switching method 30 for use in the MPLS network 10. The reduced complexity MPLS switching method 30 seeks to modify the operating regime of the MPLS network 10 to reduce control plane complexity. First, it is noted that the MPLS label space, per RFC 3032, is $2^{20}$ (i.e., $O(10^6)$). From this MPLS label space, a reserved block of MPLS labels is defined (step 31). The MPLS label space is large enough that a significant sized block of labels can be blocked off in the reserved block, sufficient to allocate a block exclusively for the use of each switch in the network domain. In an exemplary embodiment, the reserved block can include a portion of the entire MPLS label space ($2^{20}$). In another exemplary embodiment, the reserved block can include the entire MPLS label space ($2^{20}$). A non-overlapping subset of labels is uniquely assigned from the reserved block to each network element 12, 14, 16 in the MPLS network 10 (step 32). Due to the large label space, it is possible to uniquely assign to every network element 12, 14, 16 in the MPLS network 10 a reasonable number of unique labels from the reserved block, while still having the vast fraction of labels available for traditional MPLS per-hop label swap, if desired. For example, a sub-domain including 500 network elements, each assigned 20 labels, uses approximately one percent of the total label space.

The reduced complexity MPLS switching method 30 converts the MPLS operating regime from one of local allocation, i.e. each network element takes a label from the overall MPLS label space to send to a downstream network element, to one of network-wide allocation, i.e. each network element has a non-overlapping subset of labels for use that are guaranteed to be unique based on steps 31, 32. In this manner, MPLS labels are treated similarly to Internet Protocol (IP) prefixes and MAC address subsets. Each network element knows its unique significant sized block of labels a priori thereby reducing complexity in the control plane. Once assigned, the non-overlapping subset of labels can be flooded/exchanged by each network element (step 33). For example, the flooding can be based solely on interior routing protocols.

The reduced complexity MPLS switching method 30 includes operating the reserved block of the MPLS label space with a reduced complexity control plane (step 34). Since the reserved block is uniquely assigned a priori, distribution of the labels from the network elements can be performed throughout the network in a straightforward manner, without signaling. For example, Labeled routes may be exchanged within the network 10 either by use of an internal Border Gateway Protocol (iBGP) Route Reflector peered with every MPLS network element in the network 10, or by flooding labels in the IGP (as Shortest Path Bridging-MAC (SPBM) does). As such, various complex protocols are unnecessary in the network 10, such as RSVP-TE, LDP, and the like. That is, a low complexity IGP (i.e., no TE extensions) is the only remaining protocol absolutely required to operate the network 10 sub-domain. Also, to provide operation of cross-domain and inter-domain forwarding requires functions such as additional protocols (e.g. Targeted LDP, BGP or OpenFlow) or other mechanisms to mediate flows at sub-domain borders.

Operationally, at each network element on a LSP, each packet with one of the reserved block of labels is forwarded without a label swapping operation (step 35). For example, an initial packet entering at the LER 12 can be assigned a label by the LER 12 from one of its block of labels, and sent to the LSR 14. This assigned label is based on the ultimate destination of the packet in the MPLS network 10. At the LSR 14, the packet does not require a label swapping operation, but a simple look up to determine only the egress port which is on the next hop to the destination. In an exemplary embodiment, the reduced complexity MPLS switching method 30 could actually perform a label swapping operation but swapping to a same label as already provided on the packet. The LSR 14 forwards the packet to the LER 16 where the label is popped and processed accordingly. This can be viewed as providing a new tunnel service within MPLS with a dramatically reduced complexity in the control plane.

One exemplary driver for the reduced complexity MPLS switching method 30 is the emerging SPBM specification. SPBM utilizes a network-wide allocation of addressing thereby having significantly reduced complexity. However, SPBM is not widely deployed, unlike MPLS. An exemplary objective is to leverage the widely deployed base of MPLS while providing reduced complexity therewith. The inventors have approached MPLS with the observations related to what makes SPBM so simple. For example, the MPLS label space can be managed similarly to Ethernet MAC headers in SPBM. Routes will be exchanged across an Autonomous System (AS) boundary between this domain and others using by piggybacking the label in external Border Gateway Protocol (eBPG) Network Layer Reachability Information (NLRI) as per RFC 3107, "Carrying Label Information in BGP-4," May 2001, the contents of which are incorporated by reference herein.

Figure 3:
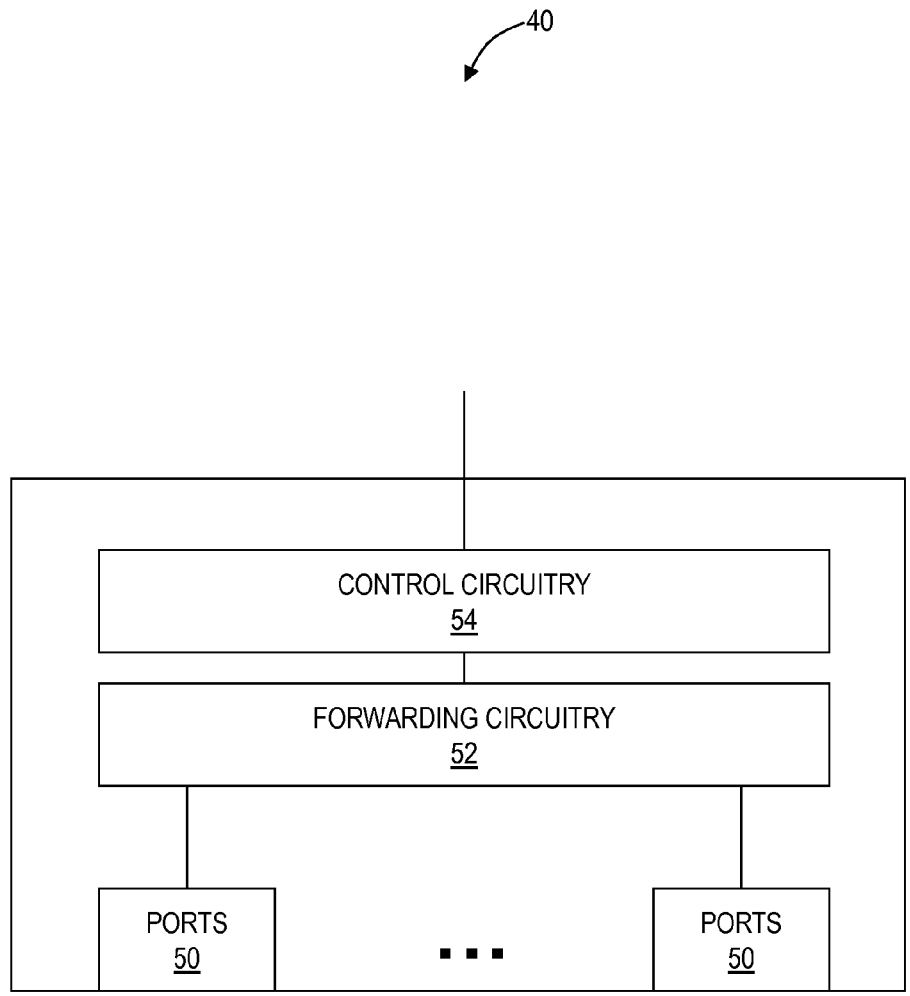
FIG. 3 is a block diagram of an exemplary implementation of a network element which may be used with the reduced complexity MPLS systems and methods of FIGS. 1 and 2.

Referring to FIG. 3, in an exemplary embodiment, a block diagram illustrates an exemplary implementation of a network element 40 which may be used with the reduced complexity MPLS systems and methods. In this exemplary embodiment, the network element 40 is a switch for illustration purposes, but those of ordinary skill in the art will recognize the reduced complexity MPLS systems and methods described herein contemplate other types of network elements and other implementations. In this exemplary embodiment, the network element 40 includes a plurality of ports 50, forwarding circuitry 52, and control circuitry 54. The network element 40 can be an LER, LSR, P node, PE node, etc.

The ports 50 provide physical connectivity of the network element 40 to other network elements, switches, routers, etc. The ports 50 are configured to provide ingress and egress of packets such as packets utilizing the reduced complexity MPLS method 30. The forwarding circuitry 52 is configured to either assign packets one of the block of labels associated with the network element 40 as per the reduced complexity MPLS method 30 or to forward a received packet with one of the block of labels associated with another network element. The control circuitry 54 is configured to provide exchange and/or flooding of the block of labels associated with the network element 40 as per the reduced complexity MPLS method 30. For example, the control circuitry 54 can perform the basic IS-IS protocol, without requiring IS-IS traffic engineering extensions or RSVP-TE and/or LDP for packets using the reduced complexity MPLS method 30.

Figure 4:
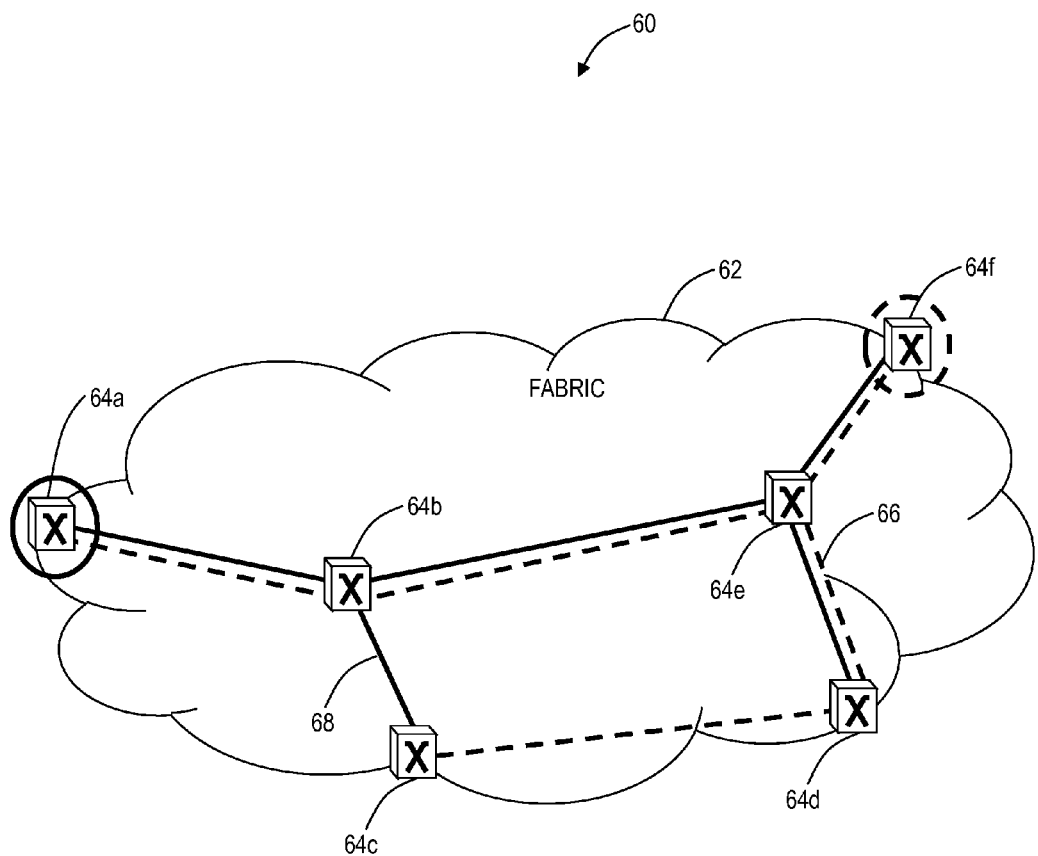
FIG. 4 is a network diagram of a network showing the reduced complexity MPLS systems and methods over a fabric.

Referring to FIG. 4, in an exemplary embodiment, a network diagram illustrates a network 60 showing the reduced complexity MPLS systems and methods. The network 60 includes a fabric 62 formed by nodes 64a, 64b, 64c, 64d, 64e, 64f interconnected by an arbitrary mesh of point-to-point links. Not all these links are shown in FIG. 4, the ones shown are that subset of links which form elements of the routes selected to destinations 64a and 64f respectively, and also the multicast trees rooted on sources 64a and 64f respectively. The nodes 64a, 64b, 64c, 64d, 64e, 64f can be the network elements 12, 14, 16, e.g. the nodes 64a, 64f can be the network elements 12, 16, respectively, and the nodes 64b, 64e can be the network element 16. As described herein in the reduced complexity MPLS systems and methods, each node 64a, 64b, 64c, 64d, 64e, 64f in the domain is assigned a set of domain-wide unique labels which may be used to forward to that node (from it for multicast). These labels can be advertised into the ISIS routing protocol associated with the Node ID (loopback address), and hence flooded to all the nodes 64a, 64b, 64c, 64d, 64e, 64f. A single SPF calculation at each allows all the unicast shortest-path forwarding state to be computed and installed, and equal-cost paths to be exploited by edge-based load spreading. "All pairs shortest path" allows Shortest Path Multicast Trees to be computed and installed without the need for a signaling protocol. For example, transit nodes compute their role in the SPTs, and install required state. The node 64f can have a multicast tree 66, and the node 64a can have a multicast tree 68.

Advantageously, the reduced complexity MPLS systems and methods offer various attributes. First, the reduced complexity MPLS systems and methods use an integrated single protocol for routing and label exchange for all connectivity types—the elimination of signaling. This includes unicast shortest path routes, offering deterministic load-spreading over equal cost paths, with congruent "go" and "return" paths for simple OAM, and Source-specific multicast (SSM) multicast trees, with service-specific pruning if required—restoration times are comparable with unicast, because trees are computed, and do not need to await unicast IGP convergence before multicast signaling to begin restoration can even start. Second, in accordance with the spirit of MPLS-TP, ISIS runs directly on Layer 2, and does not need IP. ISIS has integral reliability built into the base protocol, avoiding the state issues which Transmission Control Protocol (TCP) transport brings to High Availability software.

Third, the elimination of label-swapping is OAM-friendly. There is no link-local "chain of correctness" to verify and audit that the local label at any point is bound to the correct FEC or end-point address. Fourth, the elimination of label-swapping is well suited to the Software-Defined Networking (SDN) model. There is no link-local state to maintain and download; the same label is downloaded to every node on the route (avoiding the issue which caused ATM PVCs to be unsuccessful). The volume of the Management Information Base (MIB) State is educational. MPLS-TP will inherit the MPLS MIB (minus the FTN entry—no IP). This supports label-swapping and path merge, and requires 47 managed objects (MO) per single cross-connect (XC). Native Ethernet has just 4 MO per XC; from an OAM perspective, domain-scoped labels are just like a MAC. Finally, the elimination of signaling does not preclude Traffic Engineering, as long as the intent is Traffic Steering of aggregates, not micro-management of flows and/or per-flow bandwidth reservation, then Explicit Route Objects (EROS) computed by a Path Computation Engine (or SDN controller) can be flooded in ISIS as a means to cause forwarding state installation.

Referring to FIGS. 5-8, in various exemplary embodiments, network diagrams illustrate Segment Routed MPLS through a network 70. The network 70 includes nodes 72a, 72b, 72c, 72d, 72m, 72n, 72o, 72p, 72z. Segment Routing (SR) enables any node to select any path (explicit or derived from IGPs SPT computations) for each of its traffic classes. The path does not depend on a hop-by-hop signaling technique (neither LDP nor RSVP). It only depends on a set of "segments" that are advertised by the ISIS routing protocol. These segments act as topological sub-paths that can be combined together to form the desired path. In this manner, Segment Routed MPLS is similar to the reduced complexity MPLS systems and methods in reducing control plane complexity. Further, similar to the reduced complexity MPLS systems and methods, Segment Routed MPLS uses a range of labels in the MPLS label space dedicated to a Segment Routed control plane and these domain wide labels are unchanged throughout the MPLS domain, thus requiring no link-local state or label swapping.

Figure 5:
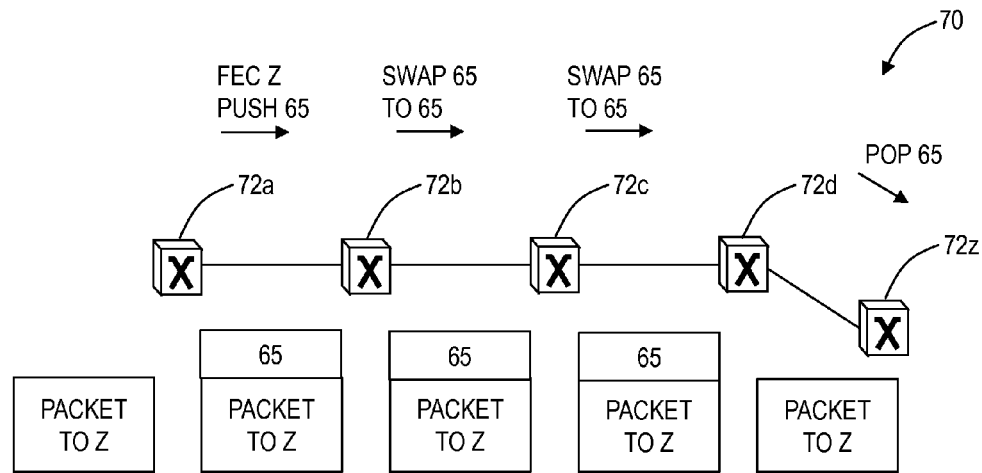
FIG. 5 is a network diagram of a network showing a node segment between nodes for Segment Routed MPLS.
Figure 6:
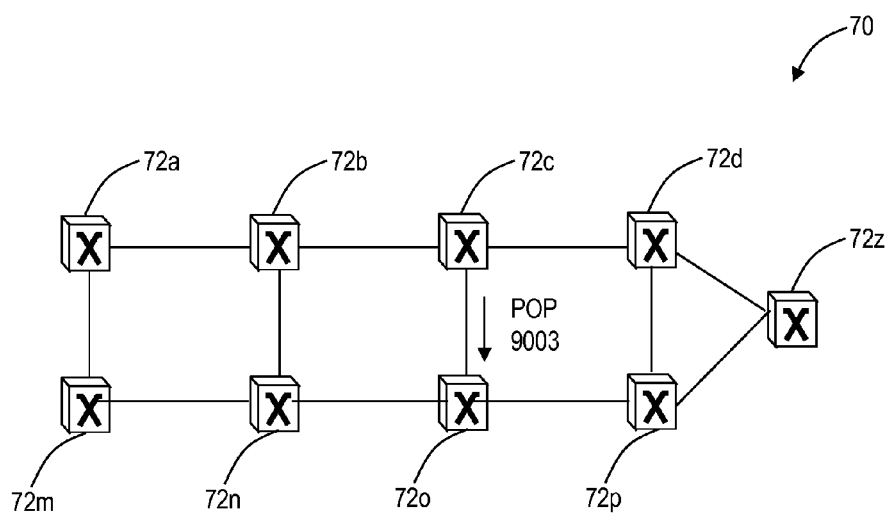
FIG. 6 is a network diagram of a network showing an adjacency segment between nodes for Segment Routed MPLS.

There are two forms of segments in Segment Routed MPLS: node and adjacency. FIG. 5 illustrates the network 70 showing a node segment between the nodes 72a, 72b, 72c, 72d, 72z. A node segment represents the shortest path to a node. A node segment is typically a multi-hop shortest path. In FIG. 5, a packet is being sent to the node 72z, i.e. a FEC Z, and a packet injected anywhere with a top label of "65" will reach the node 72z via the shortest path. FIG. 6 illustrates the network 70 showing an adjacency segment between the nodes 72c, 72o. An adjacency segment represents a specific adjacency to a node. For example, the node 72c allocates a local label, e.g. "9003", the node 72c advertises the adjacency label "9003" in ISIS, e.g. via a simple sub-Type Length Value (TLV) extension, and the node 72c is the only node to install the adjacency segment in the MPLS data plane. Thus, a packet injected at the node 72c with a label "9003" is forced through the link between the nodes 72c, 72o. The adjacency segment can be used when laying down Traffic Engineering trunks.

Figure 7:
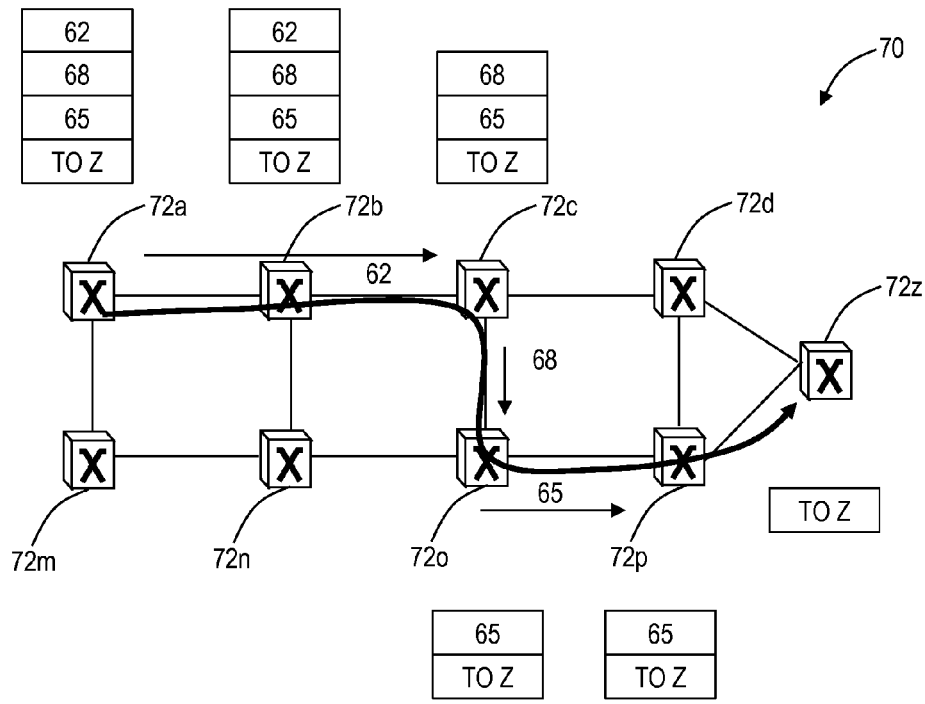
FIG. 7 is a network diagram of a network showing a combination of node segments and adjacency segments for Segment Routed MPLS.

FIG. 7 illustrates the network 70 showing a combination of node segments and adjacency segments for combined segments. Segment Routed MPLS uses node segments primarily with adjacency segments used for traffic engineering. In FIG. 7, a packet destined for the node 72z is injected at the node 72a, labels are added at the node 72a as "65" for a node segment to the node 72z, "68" for an adjacency segment between the nodes 72c, 72o, and "62" for a node segment to the node 72c. At the node 72c, the label "62" is popped (assuming Penultimate Hop Popping is disabled) and the label "68" is seen so the packet takes the adjacency segment between the nodes 72c, 72o. At the node 72o, the label "68" is popped and the label "65" is seen for the node segment to the node 72z. At the node 72z, the label "65" is popped revealing the packet destined for the node 72z.

Figure 8:
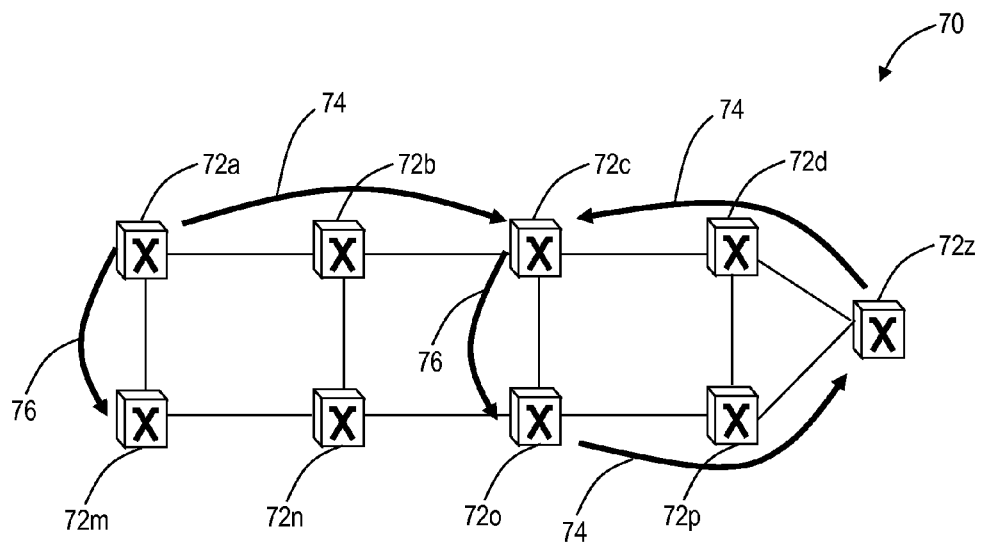
FIG. 8 is a network diagram of a network showing ISIS flooding for Segment Routed MPLS.

FIG. 8 illustrates the network 70 showing ISIS flooding and installation of segments in Segment Routed MPLS. For example, FIG. 8 includes node segments 74 and adjacency segments for the example in FIG. 7 that are flooded and automatically installed by ISIS. Of note, Segment Routed MPLS has excellent scale with each of the nodes 72 installing N+A Forwarding Information Base (FIB) entries where N is the number of nodes in the domain and A is a number of adjacency segments attached to each node. Each node 72 in the Segment Routed MPLS network 70 scales efficiently, e.g. much more than RSVP-TE. The state is located in each packet, not in the router. Scaling is on the order of N+A versus conventional MPLS which is $N^2$.

Figure 9:
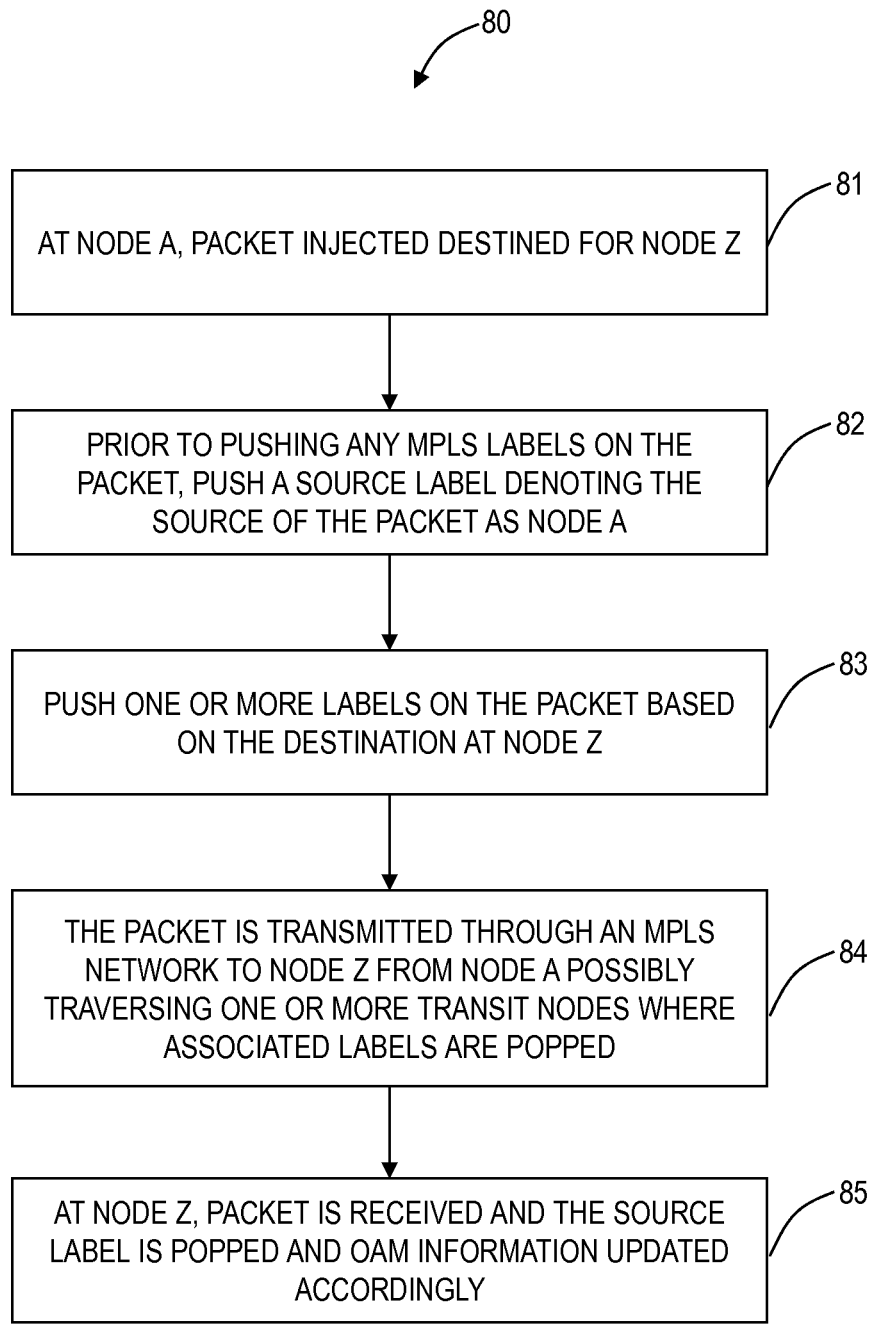
FIG. 9 is a flowchart of a source identification preservation method.

Referring to FIG. 9, in an exemplary embodiment, a flowchart illustrates a source identification preservation method 80. The source identification preservation method 80 contemplates operation in the reduced complexity MPLS network 10, the Segment Routed MPLS network 70, and other MPLS networks on associated nodes and/or network elements. Further, the source identification preservation method 80 contemplates operation with the reduced complexity MPLS method 30. The source identification preservation method 80 includes, at a node A, a packet is injected destined for a node Z in an MPLS network (step 81). In an exemplary embodiment, the MPLS network includes a Reduced Complexity MPLS network with MPLS labels uniquely assigned to a node within an MPLS domain. In another exemplary embodiment, the MPLS network includes a Segment Routed MPLS network whereby a stack of MPLS labels is interpreted, in the forwarding path of the Segment Routed MPLS network, as a sequence of source-routed path directives, each element of the sequence being an assigned domain-wide label advertised over the domain. In yet another exemplary embodiment, the MPLS network can be a regular MPLS network with the packet being a control packet.

The source identification preservation method 80 includes, prior to pushing any MPLS labels on the packet, pushing an MPLS label denoting the source of the packet as the node A (step 82). The source label is thus pushed onto the bottom-of-stack for the packet prior to pushing the label (stack) that defines the route to the destination node Z. Stated differently, the source label is the last label in the MPLS stack for the packet. In another exemplary embodiment, the "last label" above is defined not by its position in the label stack, but by the presence of an explicit reserved label identifier immediately above it in the stack. The source identification preservation method 80 includes pushing one of more labels on the packet based on the destination at node Z (step 83). Here, the MPLS stack is defined based on the route the packet will take through the MPLS network to the node Z. As described above, the source label is located at the bottom-of-the-stack such that it can easily and efficiently be popped at the destination node Z. The MPLS stack can use the techniques described herein with respect to Reduced Complexity MPLS and/or Source Routing MPLS.

The source identification preservation method 80 includes transmitting the packet through the MPLS network to the destination node Z from the source node A and possibly traversing one or more transit nodes where labels are popped and/or swapped (step 84). Here, the packet is transported over the MPLS network. The systems and methods can operate over an arbitrary mesh of point to point links provided by any appropriate transport technology—Ethernet, OTN, Layer 0, etc. At transit nodes, the labels in the MPLS stack can be swapped and/or popped as required. Of note, the source label remains since it is the last label in the MPLS stack. The source identification preservation method 80 includes, at the destination node Z, receiving the packet and the source label is popped therefrom and OAM information is updated accordingly (step 85). The OAM information can include packet and byte counters which are incremented based on the popped source label. The OAM information can also include developing a traffic matrix regardless of network size. A key aspect of the source label or explicit reserved label identifier is that it is efficient at the destination node Z and does not require deep packet inspection. Rather, the source label is merely another transport label in the MPLS stack to convey source identification information.

Figure 10:
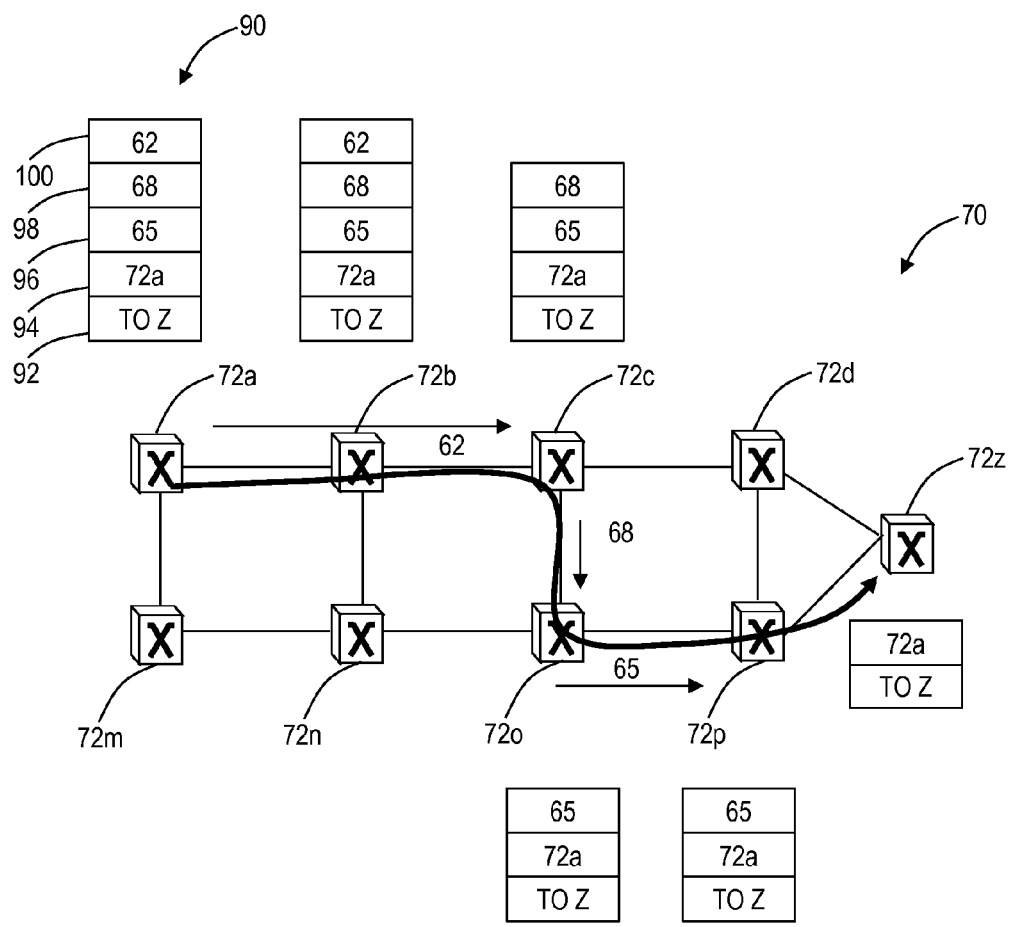
FIG. 10 is a network diagram of an exemplary operation of the source identification preservation method of FIG. 9.

Referring to FIG. 10, in an exemplary embodiment, a network diagram illustrates an exemplary operation of the source identification preservation method 80 on the Segment Routed MPLS network 70. FIG. 10 illustrates an MPLS label stack 90 on a packet 92 that is injected at the node 72a destined for the node 72z similar to the example in FIG. 7. Here, the first label pushed onto the stack at the node 72a is a source label 94, identifying node 72a itself, after which the destination label stack is pushed as in FIG. 7. The destination label stack includes a first destination label 96 as "65", a second destination label 98 as "68", and a third destination label 100 as "62". Once the packet 92 with the MPLS label stack 90 is injected into the network 70, the labels 94, 96, 98, 100 are read in last-in, first-out order. The label 100 of "62" directs the packet 92 from the node 72a to the node 72c. The label 100 can be swapped at the node 72b and popped at the node 72c. For example, the label 100 can define a node segment from the node 72a to the node 72c.

The label 98 of "68" directs the packet from the node 72c to the node 72o. The label 98 is popped at the node 72o and can define an adjacency segment from the node 72c to the node 72o. The label 96 of "65" directs the packet from the node 72o to the node 72z. For example, the label 96 can be swapped at the node 72p and popped at the node 72z. The label 96 can define another node segment from the node 72o to the node 72z. Finally, at the node 72z, the destination, the label 94 of "72a" can be popped identifying the source of the packet 92 as the node 72a. The node 72z can accordingly update OAM information quickly and efficiently without requiring deep packet inspection.

With respect to the MPLS network 10, the reduced complexity MPLS method 30, the network element 40, the network 70, the network elements 72, and the source identification preservation method 80, it will be appreciated that some exemplary embodiments described herein may include one or more generic or specialized processors ("one or more processors") such as microprocessors, digital signal processors, customized processors, and field programmable gate arrays (FPGAs), network processors, and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Multiprotocol Label Switching (MPLS) method, comprising:
    receiving a packet destined for a destination node at a source node in an MPLS network;
    pushing an identifier in an MPLS label on an MPLS label stack associated with the packet, wherein the identifier denotes the source node as the source of the packet and is pushed prior to any other MPLS labels on the MPLS stack;
    pushing one or more labels on the MPLS stack indicative of a route of the packet to the destination node;
    transmitting the packet from the source node into the MPLS network;
    popping the identifier off the MPLS label stack at the destination node; and
    updating Operations, Administration, and Maintenance (OAM) data based on the identifier by any of updating byte and packet counters, updating a traffic matrix for the MPLS network; and providing the OAM data to a network management system.

2. The MPLS method of claim 1, wherein the identifier comprises one of a source label or an explicit reserved label placed immediately above a source label on the stack.

3. The MPLS method of claim 1, wherein the MPLS network comprises a Segment Routed MPLS network whereby a stack of MPLS labels is interpreted, in a forwarding path of the MPLS network, as a sequence of source-routed path directives, each element of the sequence being an assigned domain-wide label advertised over the domain by a Link State routing protocol.

4. The MPLS method of claim 1, wherein the MPLS network comprises a Reduced Complexity MPLS network whereby one or more MPLS labels are assigned uniquely to a node within a MPLS network domain thereby simplifying operating procedures for the MPLS network domain.

5. The MPLS method of claim 1, wherein the packet comprises a control packet in the MPLS network.

6. The MPLS method of claim 1, further comprising:
    popping or swapping the one or more labels on the MPLS stack at one or more transit nodes in the MPLS network.

7. The MPLS method of claim 1, wherein the identifier is located at the bottom of the MPLS stack thereby being a last item popped in the MPLS stack at the destination node.

8. A Multiprotocol Label Switching (MPLS) network element, comprising:
    at least one port;
    forwarding circuitry communicatively coupled to the port; and
    control circuitry communicatively coupled to the forwarding circuitry and the port;
    wherein the forwarding circuitry and the control circuitry are configured to:
        receive a packet destined for a destination node in an MPLS network;
        push an identifier contained in an MPLS label on an MPLS stack associated with the packet, wherein the identifier denotes the MPLS network element as the source of the packet and is pushed prior to any other MPLS labels on the MPLS stack;
        push one or more labels on the MPLS stack indicative of a route of the packet to the destination node; and
        transmit the packet into the MPLS network; and wherein the forwarding circuitry and the control circuitry are further configured to:
receive a second packet from the MPLS network;
pop a second identifier off an MPLS stack of the second packet; and
update Operations, Administration, and Maintenance (OAM) data based on the second identifier by any of updating byte and packet counters, updating a traffic matrix for the MPLS network; and providing the OAM data to a network management system.

9. The MPLS network element of claim 8, wherein the identifier comprises one of a source label or an explicit reserved label placed immediately above a source label on the stack.

10. The MPLS network element of claim 8, wherein the MPLS network comprises a Segment Routed MPLS network whereby a stack of MPLS labels is interpreted, in a forwarding path of the MPLS network, as a sequence of source-routed path directives, each element of the sequence being an assigned domain-wide label advertised over the domain by a Link State routing protocol.

11. The MPLS network element of claim 8, wherein the MPLS network comprises a Reduced Complexity MPLS network whereby one or more MPLS labels are assigned uniquely to a node within a MPLS network domain thereby simplifying operating procedures for the MPLS network domain.

12. The MPLS network element of claim 8, wherein the packet comprises a control packet in the MPLS network.

13. The MPLS network element of claim 8, wherein the identifier is contained in an MPLS label located at the bottom of the MPLS stack thereby being a last item popped in the MPLS stack at the destination node.

14. A Multiprotocol Label Switching (MPLS) network, comprising:
a plurality of network elements connected therebetween comprising at least a first network element, a second network element, and a third network element;
wherein a first packet is sent to the first network element from the second network element with a first source identifier contained in an MPLS label on an MPLS stack;
wherein a second packet is sent to the first network element from the third network element with a second source identifier contained in an MPLS label on an MPLS stack; and
wherein the first network element is configured to:
update Operations, Administration, and Maintenance (OAM) data associated with traffic from the second network element on receipt of the first packet and popping the first source identifier; and
update the OAM data associated with traffic from the third network element on receipt of the second packet and popping the second source identifier;
wherein the OAM data is updated based on the first source identifier by any of updating byte and packet counters, updating a traffic matrix for the MPLS network; and providing the OAM data to a network management system.

15. The MPLS network of claim 14, wherein the MPLS network comprises a Segment Routed MPLS network whereby a stack of MPLS labels is interpreted, in a forwarding path of the MPLS network, as a sequence of source-routed path directives, each element of the sequence being an assigned domain-wide label advertised over the domain by a Link State routing protocol.

16. The MPLS network of claim 14, wherein the MPLS network comprises a Reduced Complexity MPLS network whereby one or more MPLS labels are assigned uniquely to a node within a MPLS network domain thereby simplifying operating procedures for the MPLS network domain.

* * * * *

UNITED STATES PATENT AND TRADEMARK OFFICE
CERTIFICATE OF CORRECTION

| | |
|---|---|
| PATENT NO. | : 9,094,337 B2 |
| APPLICATION NO. | : 13/900573 |
| DATED | : July 28, 2015 |
| INVENTOR(S) | : Nigel Lawrence Bragg et al. |

It is certified that error appears in the above-identified patent and that said Letters Patent is hereby corrected as shown below:

Title Page,

Item (73) Assignee Information

Correct Assignee's name from "Cieno Corporation" to --Ciena Corporation--

Signed and Sealed this
Twenty-ninth Day of December, 2015

Michelle K. Lee
*Director of the United States Patent and Trademark Office*